UNITED STATES PATENT OFFICE.

TRAUGOTT SANDMEYER, OF BASLE, SWITZERLAND, ASSIGNOR TO JOHN R. GEIGY & CO., OF SAME PLACE.

PROCESS OF MAKING ISATIN.

SPECIFICATION forming part of Letters Patent No. 647,279, dated April 10, 1900.

Application filed December 7, 1899. Serial No. 739,506. (No specimens.)

*To all whom it may concern:*

Be it known that I, TRAUGOTT SANDMEYER, a citizen of the Swiss Confederation, residing at Basle, Switzerland, have invented certain new and useful Improvements in Processes of Making Isatin, of which the following is a specification.

The present invention (for which patents have been applied for in Germany, G. 13,632, dated July 17, 1899; in England, No. 15,416/99, dated July 27, 1899; in France, No. 279,393, dated August 1, 1899; in Belgium, dated August 1, 1899; in Russia, dated August 1, 1899; in Italy, dated August 1, 1899; in Spain, No. 24,751, granted October 11, 1899; in Austria, dated August 1, 1899, and in Hungary, No. 13,537, dated August 1, 1899) refers to a new process for the production of isatin, consisting in producing a reaction of chloralhydrate upon anilin in the presence of chlorhydrate of hydroxylamin, condensing the thus-obtained isonitrosoethenyldiphenylamidin of the formula

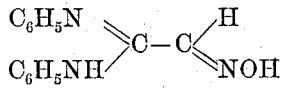

by means of concentrated sulfuric acid to alpha-isatinanilid of the formula

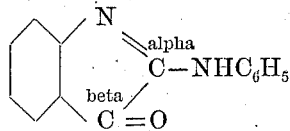

and decomposing the latter by diluted mineral acids to anilin and isatin according to the equation

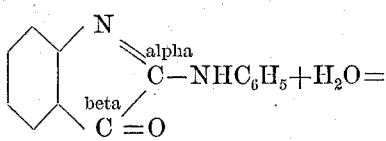

Alpha-isatinanilid.

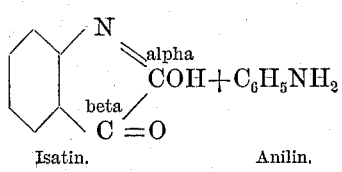

Isatin.   Anilin.

The following examples will serve to illustrate the single phases of my new process and the manner in which isatin can be obtained. The parts are by weight.

*First phase of the process—Production of isonitrosoethenyldiphenylamidin.*—In a vessel fitted with a stirrer and reflux cooler a mixture of fourteen parts of hydroxylamin chlorhydrate, sixty parts of water, and ninety parts of anilin is heated up to 90° to 100° centigrade, after which thirty-three parts of chloralhydrate are carefully added in small portions in such a manner as to let pass over the violent reaction after each addition before adding more. The mixture, consisting in the beginning of two different fluids, has become homogeneous and taken on a deep yellow color when the reaction is finished. After allowing the mixture to completely cool five hundred parts of ice-water and one hundred and twenty parts of caustic-soda lye of 40° Baumé are added, and the whole is well mixed, so that the isonitrosoethenyldiphenylamidin thus formed goes into solution. The excess of anilin as well as the by-products insoluble in alkali are then removed by repeated extraction with ether, whereupon the solution is acidulated with acetic acid, and the nitroso compound, which separates in oily drops, is likewise extracted with ether. The former remains as a thick oil after the ether has been evaporated.

*Second phase of the process—Production of alphaisatinanilid.*—One part of isonitrosoethenyldiphenylamidin is introduced into the quadruple quantity of concentrated sulfuric acid at a temperature of from 40° to 50° centigrade. When all is dissolved, the temperature is gradually raised to 100° to 105° centigrade. After the deep brownish-violet color has completely changed to an intense yellowish red the concentrated sulfuric solution is, when cold, poured, with constant stirring, into an excess of a solution of carbonate of soda, a sufficient quantity of ice added, and is then filtered, the alpha-isatinanilid separating in brown crystalline flocks.

*Third phase of the process—Production of isatin.*—One part of alpha-isatinanilid is added to a mixture of one part of sulfuric acid and three parts of water and then gradually brought to boil. The red paste of the sulfate of isatinanilid which had formed at first dissolves soon in heating up, and the separation of isatin in brown crystals begins. The decomposition finished, the solution is cooled down and the separated isatin filtered off and recrystallized from hot water.

What I claim as new, and desire to secure by Letters Patent, is—

The herein-described process of producing isatin, consisting in producing a reaction of chloralhydrate upon anilin in the presence of chlorhydrate of hydroxylamin, condensing the thus-obtained isonitrosoethenyldiphenylamidin by means of concentrated sulfuric acid to alpha-isatinanilid of the formula

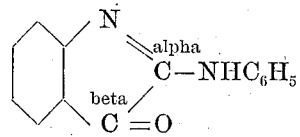

and decomposing the latter by diluted mineral acids to anilin and isatin, substantially as set forth.

In testimony that I claim the foregoing as my invention I have signed my name in presence of two subscribing witnesses.

TRAUGOTT SANDMEYER.

Witnesses:
GEORGE GIFFORD,
ALBERT GRAETER.